Figure 1:
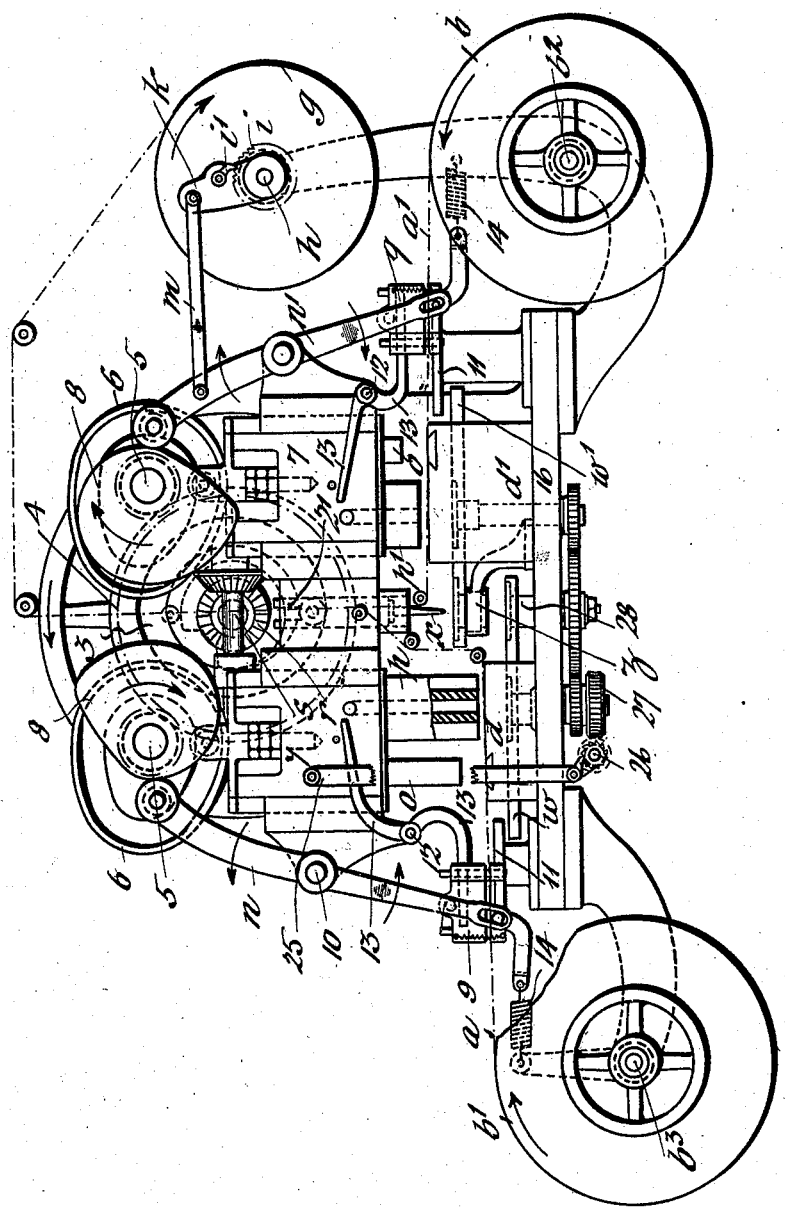

No. 858,367. PATENTED JULY 2, 1907.
A. BRODTAUF & H. FUES.
MACHINE FOR THE MANUFACTURE OF ARTIFICIAL FLOWERS.
APPLICATION FILED JAN. 15, 1906.

6 SHEETS—SHEET 1.

Witnesses
Inventors
Albin Brodtauf
Heinrich Fues
by their Attorney

No. 858,367. PATENTED JULY 2, 1907.
A. BRODTAUF & H. FUES.
MACHINE FOR THE MANUFACTURE OF ARTIFICIAL FLOWERS.
APPLICATION FILED JAN. 15, 1906.
6 SHEETS—SHEET 2.
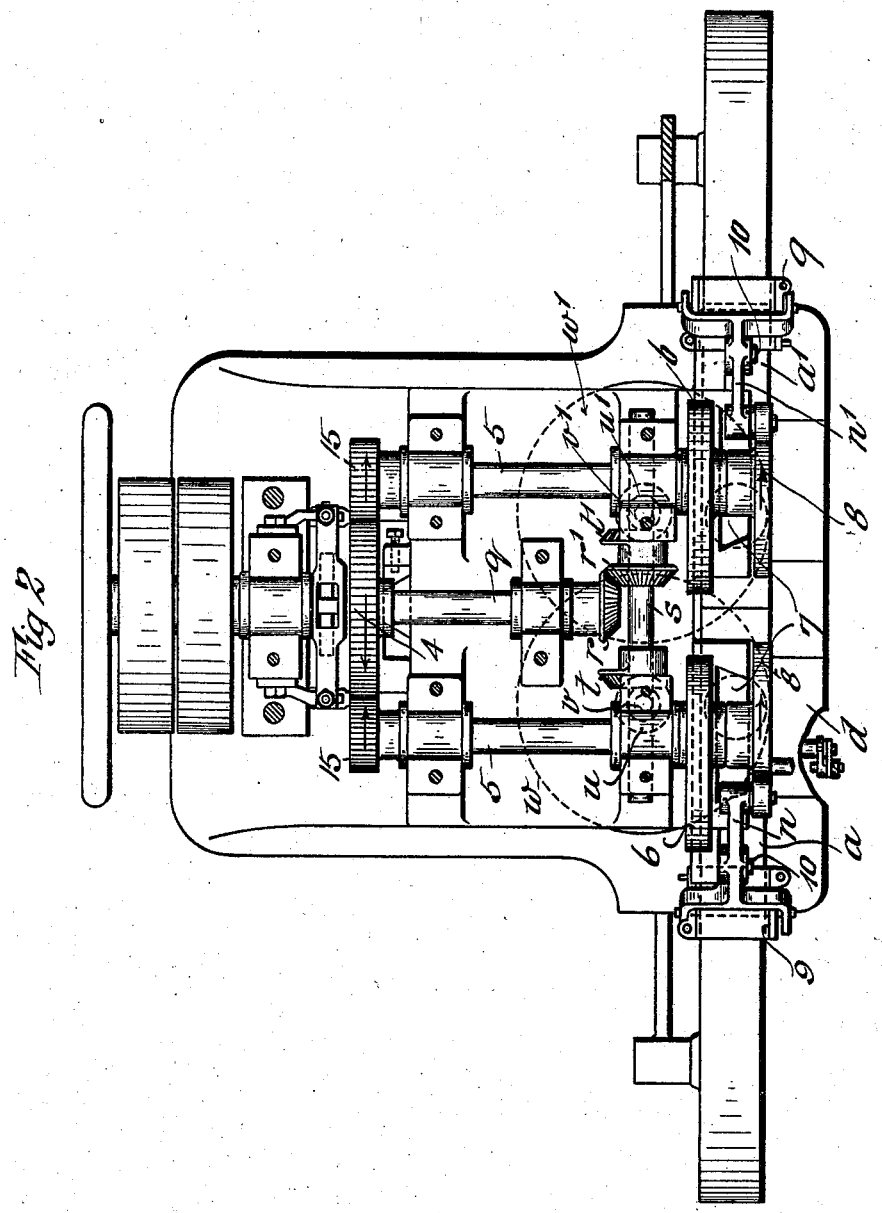

No. 858,367. PATENTED JULY 2, 1907.
A. BRODTAUF & H. FUES.
MACHINE FOR THE MANUFACTURE OF ARTIFICIAL FLOWERS.
APPLICATION FILED JAN. 15, 1906.
6 SHEETS—SHEET 3.
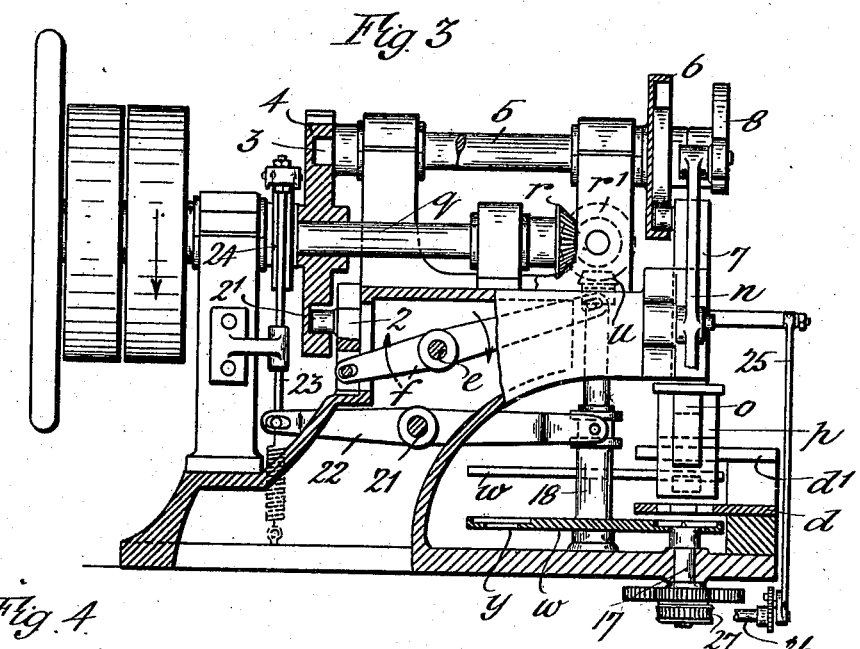
Witnesses
Inventors
Albin Brodtauf
Heinrich Fues
by their Attorney No. 858,367. PATENTED JULY 2, 1907.
A. BRODTAUF & H. FUES.
MACHINE FOR THE MANUFACTURE OF ARTIFICIAL FLOWERS.
APPLICATION FILED JAN. 15, 1906.
6 SHEETS—SHEET 4.
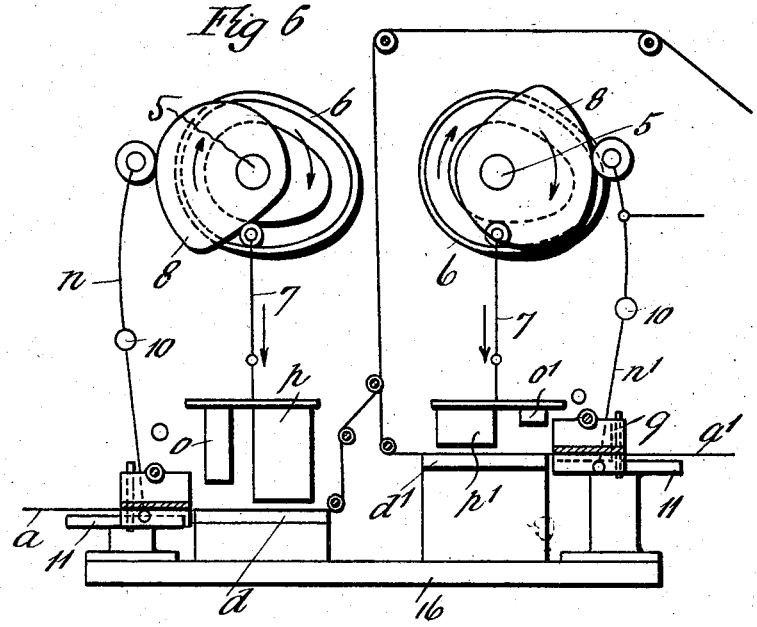
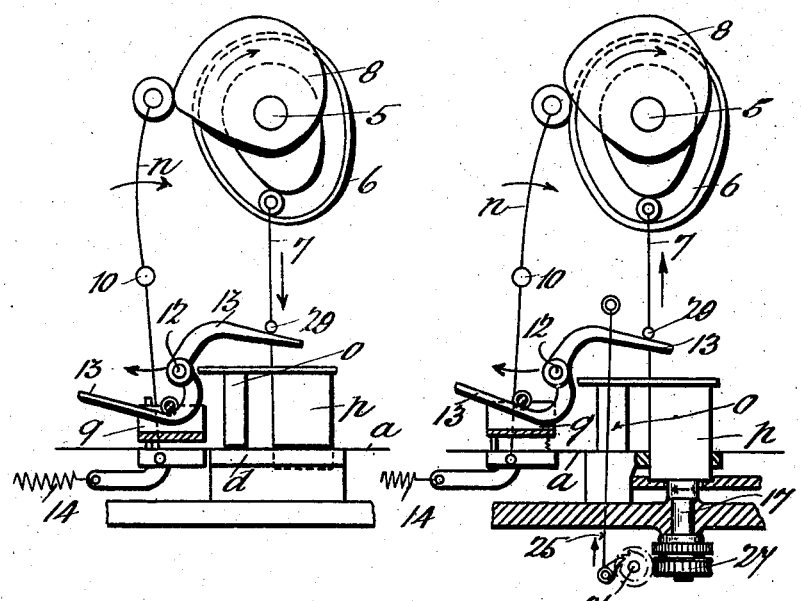

No. 858,367. PATENTED JULY 2, 1907.
A. BRODTAUF & H. FUES.
MACHINE FOR THE MANUFACTURE OF ARTIFICIAL FLOWERS.
APPLICATION FILED JAN. 15, 1906.
6 SHEETS—SHEET 5.
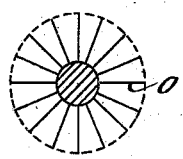
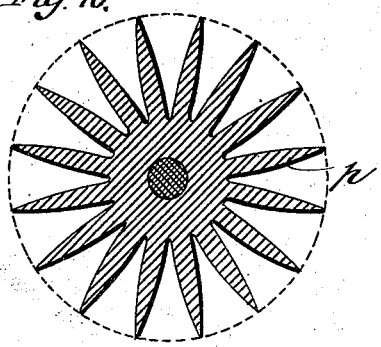
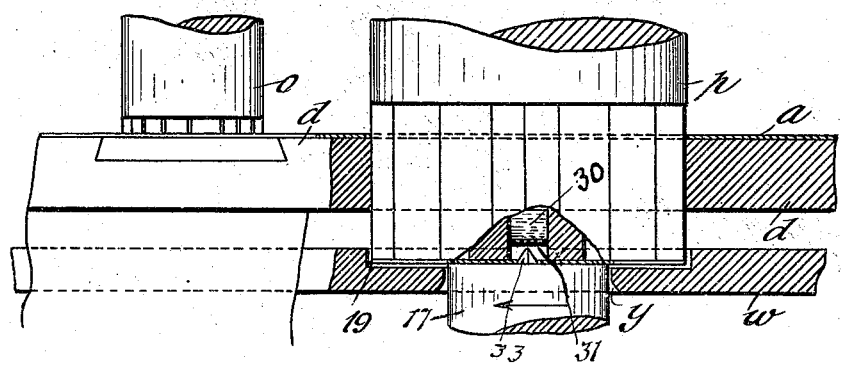
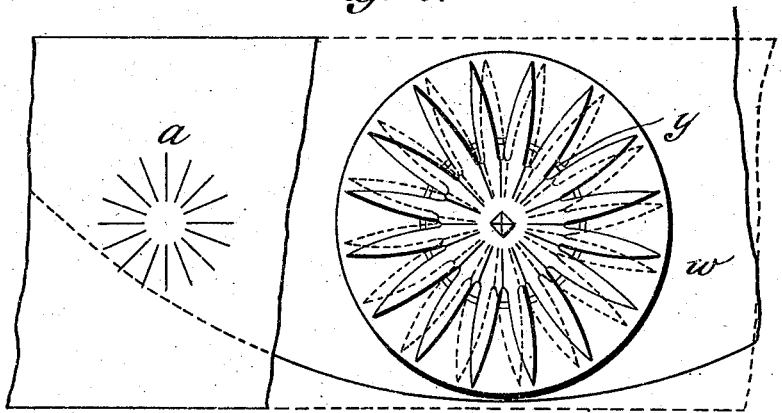
Witnesses
A. J. Haddow
S. Ford
Inventors
Alben Brodtauf
Heinrich Fues
by their Attorney No. 858,367. PATENTED JULY 2, 1907.
A. BRODTAUF & H. FUES.
MACHINE FOR THE MANUFACTURE OF ARTIFICIAL FLOWERS.
APPLICATION FILED JAN. 15, 1906.
6 SHEETS—SHEET 6.
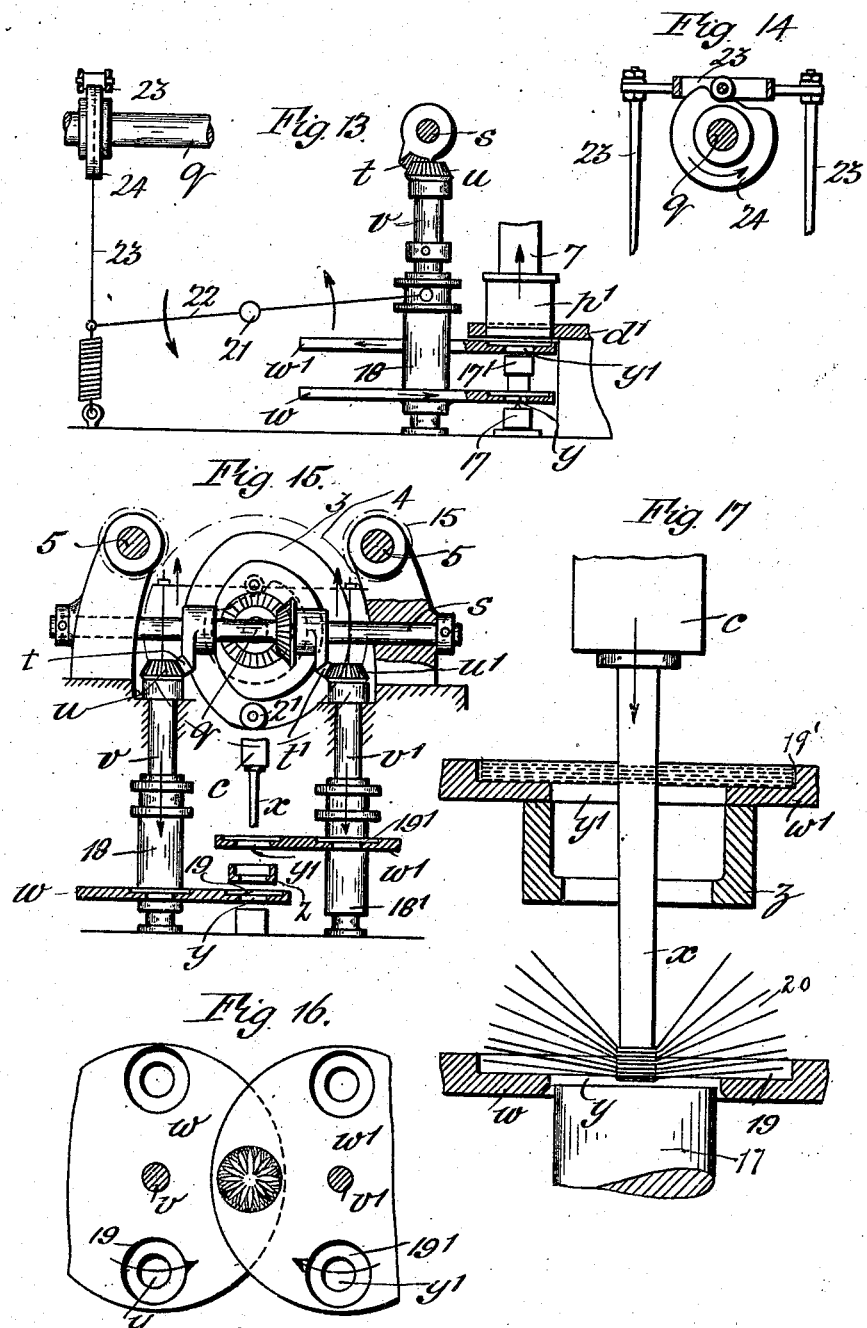

UNITED STATES PATENT OFFICE.

ALBIN BRODTAUF, OF LEIPZIG-LINDENAU, AND HEINRICH FUES, OF LEIPZIG, GERMANY.

MACHINE FOR THE MANUFACTURE OF ARTIFICIAL FLOWERS.

No. 858,367.      Specification of Letters Patent.      Patented July 2, 1907.

Application filed January 15, 1906. Serial No. 296,127.

*To all whom it may concern:*

Be it known that we, ALBIN BRODTAUF and HEINRICH FUES, subjects of the German Emperor, residing at Leipzig-Lindenau and Leipzig, respectively, both in Germany, have invented certain new and useful Improvements in Machines for the Manufacture of Artificial Flowers, of which the following is a specification.

This invention relates to an improved machine for the manufacture of artificial flowers which consist of a large number of concentric, superposed stamped-out layers, leaves or sheets of uniform shape, representing chrysanthemums, Cape roses or the like.

The improved machine is so constructed that it is adapted to cut and stamp out a suitable number of layers, and to fasten the latter together with the aid of a suitable adhesive substance in such a manner that the radial "petals" of consecutive, superposed layers are staggered with regard to each other. Two piles of stamped out layers are in the course of the operation, placed vertically one above the other on two supporting disks the upper pile being thereupon forced downward on the lower pile by a plunger which drives the said upper pile through an aperture in the upper disk and through a ring placed between the disks, so that the layers constituting the upper pile are to a certain extent bent upward in the manner of the upper petals of a flower in bloom.

The invention is illustrated in the annexed drawing, in which

Figure 1 is a side-view of the machine, Fig. 2 a plan-view thereof, Fig. 3 a cross-section of the central part of the machine, Fig. 4 a detail view, and Fig. 5 a plan-view of the feed rollers and means for vertically moving same; Fig. 6 is a diagram illustrating the positions of the stamping tools and feed-mechanism at the beginning of the stamping operation; Fig. 7 diagrammatically represents the stamping tools near their lowest position, with the band free to move; Fig. 8 represents the said tools in their lowest positions; Fig. 9 is a cross-section of the preliminary cutter and Fig. 10 a cross-section of the stamping cutter; Fig. 11 shows the preliminary cutter and stamping cutter in operative positions, and Fig. 12 represents the cut and stamped out layers on the feed-plate; Fig. 13 is a partial diagrammatic view of the mechanism for raising the feed-plates, Fig. 14 represents a detail of the said mechanism; Fig. 15 represents the driving gear for the feed-plates, and Fig. 16 is a plan view of the latter; Fig. 17 shows the relative positions of the feed-plates and the parts belonging thereto when the stamped-out layers are acted on by the mandrel by which they are caused to spread.

The machine illustrated is a twin-machine, with two preliminary slitting tools and two stamping tools, to which two bands are fed by means of two feed-grippers.

The paper-bands $a\, a^1$ (Fig. 1) are wound off cylinders $b\, b^1$ loosely mounted on axles $b^2\, b^3$, the said bands being guided, by means of suitable rollers, over matrices $d\, d^1$ to a cylinder $g$ common to them both. The cylinder $g$ is connected, by means of a helical spring not shown in the drawing, with a fixed axle $h$, which is connected, by means of pawl and ratchet mechanism $i\, i^1\, k\, m$, with a lever $n^1$, so that after each stamping operation the spring is sufficiently tensioned to wind up a length of band corresponding to the distance between the preliminary slitting tool $o$ or $o^1$ and the stamping tool $p$ or $p^1$.

All movements are produced by means of the main shaft $q$ (Fig. 2), to one end of which is fixed a bevel-wheel $r$ meshing with a bevel wheel $r^1$ mounted on a shaft $s$. Toothed segments $t$ and $t^1$ (Figs. 2 and 15) mesh, at uniform comparatively long intervals, with bevel-wheels $u\, u^1$ fixed to vertical shafts $v\, v^1$. To the latter are fixed two feed-disks $w\, w^1$ (Fig. 15). The said feed-disks are placed at different levels and are provided with apertures $y\, y^1$ so placed that as the disks are revolved these apertures come consecutively into axial line with one another. Between the disks is arranged a ring $z$ having an aperture of smaller diameter than $y$ or $y^1$. In the form of construction illustrated, the disks $w\, w^1$ make a quarter of a revolution after each fourth movement of the stamping-tools, and the disks are, therefore, provided with four apertures $y\, y^1$. Vertically above the ring $z$ there is arranged a plunger $x$ in connection with a slide $c$, the latter being connected with a slide 2 by means of a double-armed lever $f$ pivoted at $e$ (Fig. 3). A projection $2^1$ on the slide 2 extends into a cam slot 3 in a toothed wheel 4 fixed to the shaft $q$.

The wheel 4 meshes with the wheels 15 fixed to the shafts 5 (Fig. 2) the ratio being 1:4, since four layers are to be placed one above the other at each side of the machine. To the shafts 5 are fixed cams 6 (Figs. 6 to 8) connected with the tool-carriers 7. Cams 8 fixed to the shafts 5 impart reciprocating movement to grippers 9, by means of levers $n\, n^1$ pivoted at 10. The grippers 9 are slidable on blocks 11 and their breadth is such that the bands $a\, a^1$ can easily move between them when they are opened. The upper members of the grippers are pressed toward the lower members by means of springs and are raised at the proper moment by means of levers 13 pivoted at 12. The levers 13 are operated to open the grippers by projections 29 on the tool carriers 7. Springs 14 tend to move outward the grippers 9 and the lower arms of the levers $n\, n^1$, so that the upper ends of the said levers continuously bear against the cams 8.

At the front of the machine and in the path of the apertures $y\, y^1$ there are arranged axles 17 $17^1$, above the upper ends of which the apertures $y\, y^1$ are situated. The disks $w\, w^1$ are fixed to sleeves 18 $18^1$ vertically movable on the shafts $v\, v^1$ so that the apertures $y\, y^1$ can be caused to engage the axles 17 $17^1$ in such a manner that the upper surfaces of the latter, together with recesses 19 19¹ (Fig. 17) formed in the disks $w$ $w^1$, serve as rests for the layers 20 moved downward from the stamping cutters $p$ $p^1$ on to the disks $w$ $w^1$. The sleeves 18 18¹ are operated by means of levers 22 pivoted at 21 and by a cam 24 fixed to the shaft $q$ and frame 23.

From one of the tool-carriers a rod 25 extends to pawl and ratchet mechanism arranged below the bed-plate 16 and adapted to drive the worm-shaft 26 (Figs. 1 and 8) and the worm wheel 27 fixed to the axle 17. The axles 17 and 17¹ are interconnected by means of gear-wheels.

The action of the machine is as follows: At the beginning of the stamping operation the levers $n$ and $n^1$ have their lower ends in their outermost positions (Fig. 1) and the plunger $x$ is held in its highest position by means of the cam-groove 3; the disks $w$ $w^1$ are pushed down so that the axles 17 and 17¹ close the apertures $y$ $y^1$ respectively which are beneath the stamping tools $p$ $p^1$ and the block 28 closes the aperture of the disk $w$ which is at the time alined with the aperture above it in the disk $w^1$. During the rotation of the main shaft $q$ the shaft 5 and cams 8 and 6 are revolved by means of the gear wheels 4 and 15. The cams 8 operate the levers $n$ $n^1$ in such a manner that the grippers 9 are moved toward the center of the machine, so that the cylinder $g$ can draw the band underneath the tools $o$, $o^1$, $p$ and $p^1$. The cams 8 are so shaped that the grippers 9 remain at rest after having been moved in the manner described until the tools $o$ $o^1$ and $p$ $p^1$ have been moved downward by the cams 6 and carriers 7, that is to say, until the slitting and stamping operations have been effected. As soon as the stamping tools $p$ $p^1$ have come into contact with the layers $a$ $a^1$ projections 29 on the carriers 7 abut against the levers 13, so that the latter are operated to open the grippers 9. Thereupon the levers $n$ $n^1$ clear the ridges of the cams 8, so that the grippers are moved back to their original positions by the springs 14. While this is taking place the stamped out layers are forced through the matrices $d$ $d^1$ into the recesses 19, 19¹ by the stamping tools $p$ $p^1$. The latter are provided, at their centers with a cavity 30 (Fig. 11) closed below by a sieve bottom 31 to contain an adhesive which is applied to the center of the punched out piece of paper so that the latter are fastened together during the subsequent operations. The axle 17 carries on its end a pyramidal projection 33 which comes in contact at its point with the adhesive which will adhere by capillarity to the lower side of the sieve 32 and takes it off in the form of a drop. When the next paper leaf is passed onto the axle and pressed down, the projection 33 perforates the paper and the latter sweeping down the sides of the pyramid carries down with its edges the drop of adhesive and is thus attached to the leaf below it. During each upward and downward movement of the carriers 7 the rod 25 operates the worm gear 26, 27 so that the axles 17 17¹ are slightly rotated and the radial "petals" of the stamped out layers are relatively displaced or staggered (Fig. 12). Owing to the ratio of gear adopted these operations are repeated four times during each revolution of the shaft $q$ so that the disks $w$ $w^1$ are not raised from the axles 17 17¹ until after the fourth stamping operation. After being raised, the said disks are rotated through 90 degrees by the toothed segments $t$, $t^1$. By this means the apertures $y$, $y^1$ which have been situated below the stamping tools are caused to come into axial line with each other. While the levers $n$ and $n^1$ and the stamping tools are set in motion as has already been described, the plunger $x$ receives downward motion from the cam-groove 3, slide 2 and double-armed lever $f$, so that the layers in the recess 19¹ of the upper disk which is at that time beneath the plunger are forced through the aperture $y^1$ and through the ring $z$ onto the layers in the recess 19 of the disk $w$ which is underneath said recess 19¹. Eight layers are thus superposed and fastened together by means of the adhesive substance previously applied to the centers of each layer. The thrusting of the upper layers through the aperture $y^1$ and the narrower aperture of ring $z$ causes the said layers to be so bent that the superposed, stamped-out layers acquire the appearance of a flower in full bloom. The flower will remain in the recess 19 and when the disks $w$ $w^1$ are next partially revolved it may be removed by hand.

What we claim as our invention and desire to secure by Letters Patent of the United States is:—

1. In a machine for the manufacture of artificial flowers the combination with means for intermittently feeding a strip of material, of slitting and stamping tools adapted to act on said strip, an apertured disk adapted to receive superposed layers of stamped out material and a plunger adapted to force said layers through the aperture in the disk.

2. In a machine for the manufacture of artificial flowers the combination with means for intermittently moving two strips of material, of slitting and stamping cutters adapted to act on said strips, two partially superposed rotatable feed disks provided with apertures and adapted to receive superposed layers of stamped out material, and a plunger adapted to force said layers through an aperture in the upper disk onto the layers on the lower feed disk.

3. In a machine for the manufacture of artificial flowers the combination with means for intermittently moving two strips of material, of slitting and stamping cutters adapted to act on said strips, two partially superposed rotatable feed disks provided with apertures and adapted to receive superposed layers of stamped out material, a ring located between the superposed parts of said feed disks, and a plunger adapted to force said layers through an aperture in the upper disk and ring onto the layers on the lower feed disk.

4. In a machine for the manufacture of artificial flowers the combination with means for intermittently moving two strips of material, of slitting and stamping cutters adapted to act on said strips two partially superposed rotatable feed disks provided with apertures and adapted to receive superposed layers of stamped out material, supports for said layers, means for imparting intermittent rotation to said supports, a plunger adapted to force said layers through an aperture in the upper disk and ring onto the layers on the lower feed disk, and means for supplying adhesive to the respective layers.

5. In a machine for the manufacture of artificial flowers the combination of means for intermittently moving a continuous strip of material comprising spring pressed grippers through which the strip passes, means for reciprocating the grippers and means operated by the tool carriers for opening and closing said grippers, matrices over which said strip passes, slitting and stamping tools for cooperating with said matrices to slit and punch out portions of said strip, carriers supporting the tools, and cams adapted to operate said carriers.

6. In a machine for the manufacture of artificial flowers the combination of means for intermittently moving a strip of material, slitting and stamping cutters adapted to act on said strip, a carrier supporting said cutters, an apertured feed disk, adapted to receive superposed layers of stamped out material, a support for said layers, means operated by the cutter a carrier for intermittently rotating said support, means for intermittently rotating the aforesaid feed disk and means for vertically moving the latter.

7. In a machine for the manufacture of artificial flowers the combination of means for intermittently moving two strips of material, comprising reciprocating grippers through which said strips pass, and means for opening and closing said grippers, matrices over which said material passes, slitting and stamping cutters co-acting with said matrices on said strips, carriers for said cutters, two partially superposed feed disks provided with apertures, and adapted to receive superposed layers of stamped out material, means for intermittently rotating said feed disks to bring the apertures therein consecutively into axial alinement means for imparting vertical movement to said feed disks, supports for said stamped out layers, means operated by the cutter carriers for intermittently rotating said supports, a ring located between the aforesaid feed disks, a plunger adapted to force the layers of material through an aperture in the upper feed disk and through the ring on the layers on the lower feed disk and means for supplying adhesive to the respective layers substantially as described.

In witness whereof we have signed this specification in the presence of two witnesses.

ALBIN BRODTAUF.
HEINRICH FUES.

Witnesses:
HERM. FALK,
RUDOLPH FRICKE.